(12) United States Patent (10) Patent No.: US 8,346,683 B2
Dybala et al. (45) Date of Patent: Jan. 1, 2013

(54) SYSTEM, PROGRAM, AND METHOD FOR REPRESENTATION, UTILIZATION, AND MAINTENANCE OF REGULATORY KNOWLEDGE

(75) Inventors: Tomasz G. Dybala, Fairfax, VA (US); Ewa Grzybowska, Arlington, VA (US); Roman Vichr, Washington, DC (US)

(73) Assignee: Exprentis, Inc., Fairfax, VA (US)

( * ) Notice: Subject to any disclaimer, the term of this patent is extended or adjusted under 35 U.S.C. 154(b) by 440 days.

(21) Appl. No.: 12/771,587

(22) Filed: Apr. 30, 2010

(65) Prior Publication Data

US 2010/0280977 A1 Nov. 4, 2010

Related U.S. Application Data

(60) Provisional application No. 61/174,301, filed on Apr. 30, 2009.

(51) Int. Cl.
*G06N 5/00* (2006.01)
(52) U.S. Cl. ............................................. 706/11; 706/45
(58) Field of Classification Search .................... 706/11, 706/45
See application file for complete search history.

(56) References Cited

PUBLICATIONS

Gamback, Processing Swedish Sentences: A Unification-Based Grammar and Some Applications, Doctoral Thesis, Royal Institute of Technology, Sweden, Jun. 1997, pp. 1-265.*

* cited by examiner

*Primary Examiner* — Wilbert L Starks
(74) *Attorney, Agent, or Firm* — Miles & Stockbridge P.C.

(57) ABSTRACT

A knowledge based system, program, and method for regulatory knowledge representation, utilization, and maintenance is presented. The system, program, and method support advanced reasoning concerning entities and events in order to determine their adherence to regulations and policies, with the specific ability to identify violations of regulations that govern industries such as the financial services industry. Advanced approaches and methods that allow for efficient representation of regulatory knowledge, its utilization and maintenance are specifically defined. Events and actions like, for instance, financial transactions or regulatory compliance violations can be evaluated on an automated basis by applying various approaches and methods using the regulatory knowledge system.

32 Claims, 13 Drawing Sheets

*Rule 2440. Fair Prices and Commissions (100)*

In securities transactions, whether in "listed" or "unlisted" securities (102), if a member (103) buys (102) for his own account from his customer (103), or sells for his own account to his customer (101), he shall buy or sell at a price which is fair (104), taking into consideration all relevant circumstances, including market conditions with respect to such security at the time of the transaction, the expense involved, and the fact that he is entitled to a profit; and if he acts as agent for his customer in any such transaction, he shall not charge his customer more than a fair commission or service charge, taking into consideration all relevant circumstances, including market conditions with respect to such security at the time of the transaction, the expense of executing the order and the value of any service he may have rendered by reason of his experience in and knowledge of such security and the market thereafter (105).

*Interpretative Message-2440. Mark-Up Policy (100)* (abridged for the purpose of illustration)

It shall be deemed a violation of Rule 2110 and Rule 2440 for a member to enter into any transaction with a customer in any security at any price not reasonably related to the current market price of the security or to charge a commission which is not reasonable.

(a) General Considerations
Since the adoption of the "5% Policy" the Board has determined that:
(1) The "5% Policy" is a guide, not a rule. (105)
(2) A member may not justify mark-ups on the basis of expenses which are excessive.

(b) Relevant Factors (106)
(1) The Type of Security Involved
(2) The Availability of the Security in the Market
(3) The Price of the Security
(4) The Amount of Money Involved in a Transaction
(5) Disclosure
(6) The Pattern of Mark-Ups
(7) The Nature of the Member's Business
(8) Transactions to Which the Policy is Applicable (101)
    1) A transaction in which a member buys a security to fill an order for the same security previously received from a customer. This transaction would include the so-called "riskless" or "simultaneous" transaction.
    (2) A transaction in which the member sells a security to a customer from inventory. In such a case the amount of the mark-up would be determined on the basis of the mark-up over the bona fide representative current market. The amount of profit or loss to the member from market appreciation or depreciation before, or after, the date of the transaction with the customer would not ordinarily enter into the determination of the amount or fairness of the mark-up.
    (3) .... other applicability conditions (abridged for the purpose of illustration)

FIG. 1

Regulation Concept: Rule 2440 Fair Prices and Commissions

*Feature → Value Pairs:* (200)

Applicability Conditions (201)
| | |
|---|---|
| Applicable to Transaction | → buy, sell (202) |
| Applicable to Market | → over-the-counter, exchange (202) |
| Applicable to Security | → listed, unlisted (202) |
| Applicable to Trading Party | → trader, supervisor, individual customer (203) |

Objectives/Guidelines (204)
Has as Objective
→ appropriate commission
→ fair price to the customer
→ appropriate charge for service

Constraints (205)
| | |
|---|---|
| Min Principal Amount | → $10,000 |
| Max Profit Margin | → 5% |
| Max FI Profit Margin | → 3% |

Relevant Factors (206)
| | |
|---|---|
| Market Factors | → volatility |
| Security Factors | → liquidity, marketability |
| Price Factors | → unit price, principal amount, expense involved, |
| Conduct Factors | → disclosure to customer, pattern of mark-ups |

Relationships (207)
Is Related To Regulation
→ Notice 08-36 Fair Prices and Commissions,
→ IM 2440-1 Mark Up Policy
→ IM 2440-2 Additional Mark-Up Policy
        For Transactions in Debt Securities
→ Rule 2110 Standards of Commercial Honor
   & Principles of Trade Impacts Business Procedure → FI Trade Price Evaluation Procedure (208)

FIG. 2

Analytical Procedure: Determination if a price markup satisfies regulatory obligations applicable to debt security transactions.

When analyzing a transaction in a debt security (307), or an alert (310) pointing to such a transaction (307), collect facts and identify circumstances to determine the extent to which trader used "reasonable diligence" to comply with his best execution and fair pricing obligations. Factors to be considered are technological developments and changes in the markets when assessing whether a trader (307) exercised reasonable diligence and met his regulatory obligations in these markets. Perform the following analytical steps:

Evaluate Compliance with Rule 2440 Fair Prices and Commissions (309)
1. Evaluate if the percentage markup exceeds the parameter appropriate for the type of a security traded. (301)
2. Evaluate if the absolute markup amount exceeds the parameter (applicable to all types of fixed income security trades). (302)

The calculation of a mark-up (or a mark-down) must be based on the transaction amount (not including accrued interest) and not par value (or "face amount"). This principle applies whether the debt security trades at a discount or a premium (306)

Does the trade's price appear to be too high (when the customer bought) or too low (when the customer sold), (306).

Does the cost and risk to the firm appear disproportionately low when compared to the total mark-up (or mark-down) or commission retained by the trader. (306)

Review similar riskless or contemporaneous paired transactions when reviewing the propriety of mark-ups (or mark-downs). (306)

Evaluate compliance with Rule 2320 Best Execution and Inter-positioning (309)
1. Using the available market data, determine if the security was liquid (308) during execution of the trade. (303)
2. Using the available market data, check if the price of the security was volatile (308) on the trade execution date. (304)
3. Using the available market data, check if the price substantially deviates (308) from the public and other pricing information available to the trader at the time of execution of the trade. Identify actions taken to assess the market price of a traded debt security, check if: (305)
   - securities pricing information and transaction reports were reasonably available, consider the extent to which the trader reviewed and documented its review of such information in arriving at its pricing determination.
   - a trader's price to its customer substantially deviates from the public or other pricing information available to the trader at that time that it is handling and/or executing a customer order, the trader should be prepared to provide documentation of how and why the member obtained an execution at the price that it did.
   - the trader fulfilled their responsibility to access multiple, reliable market sources for relevant pricing information and liquidity where reasonably available.

FIG. 3

FI Trade Price Evaluation Procedure Concept

*Feature → Value Pairs:* (400)

Objectives/Guidelines (401)
Has as Objective → evaluate compliance of FI trade with applicable regulations

Applicability Conditions (402)
Applicable to Transaction → buy, sell
Applicable to Market → over-the-counter
Applicable to Security → fixed-income, unlisted
Applicable to Trading Party → trader, individual customer

Input Factors (403)
unit price, principal amount, markup (markdown)
daily: number of trades, min price, max price
weekly: number of trades, number of firms

Relationships (404)
Is Driven By Regulation → Rule 2440 Fair Prices and Commissions,
→ IM 2440-1 Mark Up Policy
→ Rule 2320 Best Execution and Interpositioning Is Supported by Decisions → a – Determine Excessiveness of Absolute Markup
(405) → a – Determine Excessiveness of Relative Markup
→ A – Evaluate Compliance with Rule 2440
→ b – Determine Security Liquidity
→ b – Determine Market Volatility
→ b – Determine Price Info Accessibility
→ B – Evaluate Compliance with Rule 2320
→ C – Evaluate FI Trade Compliance Applies to Analysis of Activity → trade of debt security
→ excessive markup red flag

Parameters (406)
Min Principal Amount
Max Markup for Distress Security
Max Markup for Investment Grade Security
Min Price Diff for Volatile Security
Min Daily Trade Count for Liquid Security

FIG. 4

Concept: Rule 2440

Has as Objective
→ appropriate commission (501)
→ fair price to the customer
→ appropriate charge for service Impacts Business Procedure
→ FI Trade Price Evaluation Procedure
(502)
Is Related To Regulation → Notice 08-36
→ IM 2440-1
→ IM 2440-2
→ Rule 2110

Applicable to Transaction → buy, sell
Applicable to Market → over-the-counter,
exchange (503)
Applicable to Security → listed, unlisted
Applicable to Trading Party → trader,
supervisor,
customer Market Factors → volatility
Security Factors → liquidity, marketability
Price Factors → unit price,
principal amount, (504)
expense involved
Conduct Factors → disclosure to customer,
pattern of mark-ups Min Transaction Amount → $1,000
Max Profit Margin → 5%
Max FI Profit Margin → 3%

Concept: FI Trade Price Evaluation Procedure

Has as Objective
→ evaluate compliance of FI trade
with applicable regulations

Applies to Analysis of Activity
→ trade of debt security
→ excessive markup red flag Is Driven By Regulation
→ Rule 2440
→ IM 2440-1
→ Rule 2320

Applicable to Transaction → buy, sell
Applicable to Market → over-the-counter
Applicable to Security → fixed-income, unlisted
Applicable to Trading Party → trader Input Factors
unit price, principal amount, markup (markdown)
daily: number of trades, min price, max price
weekly: number of trades, number of firms Parameters
Min Principal Amount
Max Markup for Distress Security
Max Markup for Investment Grade Security
Min Price Diff for Volatile Security
Min Daily Trade Count for Liquid Security Is Supported by Decisions
→ a – Determine Excessiveness of Absolute Markup
→ a – Determine Excessiveness of Relative Markup
→ A – Evaluate Compliance with Rule 2440
→ b – Evaluate Security Liquidity
→ b – Evaluate Market Volatility
→ b – Evaluate Price Info Accessibility
→ B – Evaluate Compliance with Rule 2320
→ C – Evaluate FI Trade Compliance

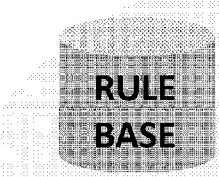

(505) RULE BASE

FIG. 5

Decision's problem statement:
Evaluate compliance of *Trade 713* with applicable regulations and policies. (800)
*Sub-problem statements:*
1. Retrieve data necessary to evaluate compliance of *Trade #713* (802) with the applicable regulations and policies. (801)
    1. .... several data retrieval steps. (803)
2. Evaluate compliance of *Trade #713* (802) with <u>Rule 2440 Fair Prices and Commissions</u> (804), and with <u>Rule 2320 Best Execution and Interpositioning</u> (805). (806)
    1. Evaluate compliance of *Trade #713* with <u>Rule 2440 Fair Prices and Commissions</u> (807)
    2. Evaluate compliance of *Trade #713* with <u>Rule 2320 Best Execution and Interpositioning.</u> (808)
3. Using the available facts (809), determine compliance of *Trade #713* with applicable regulations and policies. (810)

Legend: *Italic font – data interface elements*, <u>Underlined font – knowledge elements</u>

Decision's problem statement:
Evaluate compliance of *Trade 713* with <u>Rule 2320 Best Execution and Interpositioning.</u> (811)
*Sub-problem statements:*
1. Retrieve data necessary to evaluate compliance of *Trade #713* with <u>Rule 2320 Best Execution and Interpositioning</u>, knowing that a traded <u>Fixed Income security</u> was *DPH-GE* (812) and the execution date was *2006.10.13* (813). (814)
    1. Retrieve daily *market profile data* for *DPH-GE* on *2006.10.13* (815)
    2. Retrieve weekly *market profile data* for *DPH-GE* for the week ending on *2006.10.13*. (815)
    3. Calculate percentage and absolute spreads between the price on Trade #713 and an average price for the *DPH-GE* security for the week ending on *2006.10.13*, and add them to the weekly market profile data record. (815)
2. Using the available data, evaluate compliance of *Trade #713* with <u>Rule 2320 Best Execution and Interpositioning.</u> (816)
    1. Using the available market data, determine if *DPH-GE* was a liquid security during execution of *Trade #713*. (817)
    2. Using the available market data, check if the price of the *DPH-GE* security was volatile on the trade execution date of *Trade #713*. (817)
    3. Using the available market data, check if the price substantially deviates from public pricing information available at the time of execution of *Trade #713*. (817)

FIG. 8

| | |
|---|---|
| Decision Problem Statement: | Using available data, evaluate compliance of *Trade 713* with Rule 2440 Fair Prices and Commission. (1000) |
| BRK 8130 R2 Description: | When both the percentage markup and the absolute markup thresholds are exceeded, then a riskless principal FI trade is not compliant with Rule 2440 Fair Prices and Commission. (1001) |

IF:
(1002) r1 is Rule 2440 Fair Prices and Commissions
(1003) r1.has as objective = fair price to the customer
(1004) r1.applicable to transaction type = riskless principal
(1005) t1 is record of transaction data (*Trade 713*)
(1006) t2 is record of transaction data (*Trade 024*)
(1007) r1.applicable to trading party = trader, individual customer
(1008) t1.buyer type = individual customer (*John Smith*)
(1009) t2.seller type = trader (*Jim Doe*)
(1010) t1.buyer = t2.seller (*Jim Doe*)
(1011) t1.seller organization = *AFRM*
(1012) t1.report date = t2.report date (*20061013*) and t1.report time >= t2.report time (*11:04:00, 11:03:59*)
(1013) t1.traded quantity = t2.traded quantity (50) and t1.unit price >= t2.unit price (*73.4, 69.1*)
(1014) t1.security = t2.security (*DPH-GE*) and t1.security = investment grade corporate bond
(1015) r1.applicable to market = over-the-counter
(1016) r1.applicable to security = unlisted
(1017) p1 is FI Trade Price Evaluation Procedure
(1018) p1.is driven by regulation = Rule 2440 Fair Prices and Commissions
(1019) r1 is rule BRK 8130 R2
(1020) r1.is part of FI Trade Price Evaluation Procedure
(1021) r1.requires to consider factor = absolute markup, percentage markup
(1022) t1.principal amount (*36,700*) >= p1. Min Principal Amount (10,000)
(1023) t1.absolute markup (*2,150*) >= p1. Max Absolute Markup for Investment Grade Security (2,000)
(1024) t1.percentage markup (*6.22%*) >= p1.Max Percentage Markup for Investment Grade Security (5%)

THEN: Concluding actions for *Trade 713*:
(1025) Rule 2440 Compliance Status = Not Compliant;
(1026) Rule 2440 Compliance Primary Event = The event analyzed was the *Trade 713*;
(1027) Rule 2440 Compliance Decision = *Jim Doe* and *AFRM* Inc did not comply with Rule 2440 Fair Prices and Commission when setting the price on *Trade 713*, because both the absolute and percentage markups were excessive considering the circumstances.
(1028) Rule 2440 Compliance Input Facts = The traded security was *DPH-GE* which is an investment grade corporate bond, the unit price was *$73.4*, the riskless principal baseline price was *$69.1*, the traded bond quantity was *50*; the buyer was an individual customer *John Smith*, the seller was the trader *Jim Doe* from the *ARFM* organization who executed a riskless principal *Trade 024*, the absolute markup was *$2,150* and it exceeded the Max Absolute Markup for Investment Grade Security threshold, the percentage markup was *6.22%* and it exceeded the Max Percentage Markup for Investment Grade Security threshold;
(1029) Rule 2440 Compliance Decision Drivers = The decision has been made based on Rule BRK 8130 R2 which is a part of the FI Trade Evaluation Procedure and is based on the applicable regulation Rule 2440 Fair Prices and Commission;

Legend: *Italic font* – data interface elements, Underlined font – knowledge elements

FIG. 10

| | |
|---|---|
| Request: | Check compliance of *Trade 713* with applicable regulations and policies. |
| Answer:<br>(1100) | *Jim Doe* and the *AFRM* organization did not comply with the applicable <u>Rule 2440 Fair Prices and Commission</u> and <u>Rule 2320 Best Execution and Inter-positioning</u> when setting the price on *Trade 713*. |

| | |
|---|---|
| Request: | Check compliance of *Trade 713* with applicable regulations and policies and provide a complete explanation. |
| Answer:<br>(1101) | *Jim Doe* and the *AFRM* organization did not comply with the applicable <u>Rule 2440 Fair Prices and Commission</u> and <u>Rule 2320 Best Execution and Inter-positioning</u> when setting the price on *Trade 713*. The traded security was *DPH-GE* which is an <u>investment grade corporate bond</u>, the unit price was *$73.4*, the riskless principal baseline price was *$69.1*, the traded bond quantity was *50*; the buyer was an <u>individual customer</u> *John Smith*, the seller was the <u>trader</u> *Jim Doe* from the *ARFM* organization who executed a <u>riskless principal</u> *Trade 024*, the absolute markup was *$2,150* and it exceeded the <u>Max Absolute Markup for Investment Grade Security</u> threshold, the percentage markup was *6.22%* and it exceeded the <u>Max Percentage Markup for Investment Grade Security</u> threshold;<br>The available market data indicates that the price offered by to *John Smith* on *Trade 713* substantially deviates from pricing information available from the *TRACE system* to *AFRM* at the time of execution of *Trade 713*. The available market data from the *MDIS system* indicates that the price of the *DPH-GE* security was not volatile on the trade execution date of *Trade 713*.<br>The available market data indicates that the *DPH-GE* was a liquid security during execution of *Trade 713*. |

| | |
|---|---|
| Request: | Check compliance of *Trade 713* with applicable regulations and policies and take an action required by the applicable compliance procedure. |
| Answer:<br>(1102) | *Jim Doe* and the *AFRM* organization did not comply with the applicable <u>Rule 2440 Fair Prices and Commission</u> and <u>Rule 2320 Best Execution and Inter-positioning</u> when setting the price on *Trade 713*.<br>A complete explanation of this analysis was emailed to the *SeniorComplianceAnalyst@afrm.com* and a case number *c893274* was opened in the *CCM* system. |

Legend: *Italic font* — *data interface elements*, <u>Underlined font – knowledge elements</u>

FIG. 11

SYSTEM, PROGRAM, AND METHOD FOR REPRESENTATION, UTILIZATION, AND MAINTENANCE OF REGULATORY KNOWLEDGE

CROSS REFERENCE TO RELATED APPLICATIONS

This application claims the benefit of U.S. Provisional Application No. 61/174,301, filed Apr. 30, 2009.

STATEMENT REGARDING FEDERALLY SPONSORED RESEARCH OR DEVELOPMENT

This invention was made with the support of the U.S. government under Grant Number IIP-0750461 from the National Science Foundation (NSF). The U.S. government has certain rights in this invention.

BACKGROUND

The present invention generally relates to computer-implemented knowledge-based systems. More particularly, the present invention relates to regulatory knowledge representation, regulatory knowledge utilization, and regulatory knowledge maintenance systems that use embedded regulatory knowledge as well as other types of knowledge to determine if corporate actions or other related events and actions comply with applicable external regulations, and/or with internal policies and procedures. The present invention uses the term "Regulatory Knowledge Base" to denote the structure, the key components, and the methods for development, utilization, and maintenance of the regulatory knowledge necessary for evaluation of actions and events for their compliance with applicable regulations, policies and procedures. Regulatory knowledge is defined here in a broad sense and it covers all the means necessary to control or regulate operations of a business entity.

The current capabilities of computer systems and computer networks promote the availability of rich information about actions and events involving people and computers. The low cost of storage and transmission of such information means that all of the details about those actions and events can be captured and analyzed. The events represent either a single action or multiple actions correlated to each other in certain ways. Those actions involve people or computers and represent, for instance; financial transactions, mouse clicks, selections and invocations of computer actions, or others.

Every contemporary enterprise operates because its employees or computer systems take actions. Those actions have to be guided by the knowledge of government (federal, state, county, city) regulations, industry regulations, internal policies or procedures, and various rules of the trade they represent. In order to assure that proper actions are taken, the enterprise must not only check compliance of those actions with the applicable regulations and policies, but must also assure that those actions follow guidelines aiming to optimize the enterprise performance.

One area in which compliance of corporate actions with the applicable regulations and policies is especially important is the financial arena. The tremendous volume of financial transactions necessitates automated inspection of preceding and following corporate actions and events to check for their compliance with legal requirements and to identify those that violate those requirements. Typical monitoring of such actions applies specific tests and combinations of tests to provide an early indication of the possibility of questionable activities. Such early indicators of questionable activities are later analyzed by groups of compliance analysts to determine which of them constitute true violations.

Currently, no system or method exists for explicit representation of the regulatory knowledge that would allow for direct transformation, representation, utilization, and maintenance of a variety of external regulations and internal policies governing operations of an enterprise. There is no system or method that would use natural language statements built from regulatory knowledge structures that on the one hand could be directly processed by a computer system, and on the other hand would be fully comprehend-able by humans who are not computer experts.

Therefore, a system, program, and a method are needed for representation, utilization, and maintenance of regulatory knowledge that could be directly and automatically used to evaluate corporate actions and events for their compliance with applicable regulations and policies.

In particular, a more specific need exists for such a knowledge representation structure and a system and a method for evaluation of actions and events that represent financial transactions and other activities of a financial services enterprise in order to ensure a full protection of the financial assets, assurance of the best services and products available to the customer, and the integrity of the financial markets. It should be noted, and recognized by those skilled in the art, that the Regulatory Knowledge Base system and method described in this embodiment are not limited to the financial services industry, and that the financial service industry applications are used only as examples to better illustrate the proposed invention.

SUMMARY

In an exemplary embodiment, the invention includes the system, program and method for: (i) Representation of the regulatory knowledge in such structured format that the applicable knowledge can be directly derived from regulatory documents and/or expert experience and embodied into computer system in such a way that at the same time it is understood by users of the system and is process-able by the computer system; (ii) Utilization of the regulatory knowledge in such a way that it is directly used to evaluate whether corporate entities, actions and events are compliant with the applicable regulations and policies; (iii) Maintenance of regulatory knowledge in such a way that the knowledge base structures are updated based on the experience and based on the changes introduced into the regulations and policies, in order to assure that the system uses the most recent and current regulations and internal policies; (iv) Supporting interfacing between the system and other systems and the user by a semi-structured natural language communication.

Accordingly, in the exemplary embodiment, the invented knowledge base structure, system and method for evaluating compliance of corporate actions with regulations and policies includes the following steps: (i) periodically receiving semi-structured natural language requests to evaluate compliance of certain events, actions, or entities with applicable regulations and policies; (ii) interpreting those requests to determine applicability of the regulations and policies that should be used to respond to those requests; (iii) retrieving applicable knowledge elements that analyze the request and decompose it into components to which various elements of the regulatory knowledge are applicable; (iv) collecting certain facts necessary to evaluate the request and determining their validity based on the applicable knowledge components; (v) composing intermediate conclusions based on the collected facts and other conclusions; (vi) drawing the final conclusion that is presented as a response to the original request. The initial request is preferably a predetermined event, an action, or an entity, and specifically, an undesired event or action related, for instance, to financial transactions or trading. The request may include structured and semi-structured components that describe an action, a situation, or an entity to be evaluated. The response may include determination of the regulatory violation, a conclusion of any nature drawn based on collected facts, for instance a conclusion that would indicate that the evaluated transaction is potentially fraudulent even if it does not explicitly violate any regulations; or even a request for more facts if certain conclusions cannot be drawn based on the available information.

Optionally, a response to the initial request may be an action taken by the knowledge-based system, or a request for such action sent to another system. For instance, the response may cause certain records in certain databases to be updated, or cause certain actions, such as allowing or stopping execution of a transaction to be taken by other systems or people.

The representation of regulatory knowledge may be embodied in various types of representation formats residing on a computer-readable medium. In particular the types of applicable representation formats can be, but are not limited to, a combination of reasoning rules and vocabularies, a combination of reasoning rules and database models represented as entity-relationship diagrams, or a combination of reasoning rules and ontologies or semantic networks.

BRIEF DESCRIPTION OF THE DRAWINGS

The accompanying drawings, which are incorporated in and form a part of the specification, illustrate examples of preferred embodiments of the present invention and, together with the description serve to explain the principles of the invention. The embodiments illustrated in the drawings should not be read to constitute limiting requirements, but instead are intended to assist the reader in understanding the invention.

FIG. 1 shows an example of the legal definition of a regulation.

FIG. 2 shows an example of the structured definition of a regulation concept.

FIG. 3 shows an example of the formal description of an analytical procedure.

FIG. 4 shows an example of the structured definition of a business procedure concept.

FIG. 5 shows examples of correlations between regulation and procedure concepts.

FIG. 8 shows an example of a regulatory problem decomposition rule.

FIG. 10 shows an example of a rule drawing partial conclusions based on facts.

FIG. 11 shows an example of a rule drawing final complex conclusions.

DETAILED DESCRIPTION

Figure 6:
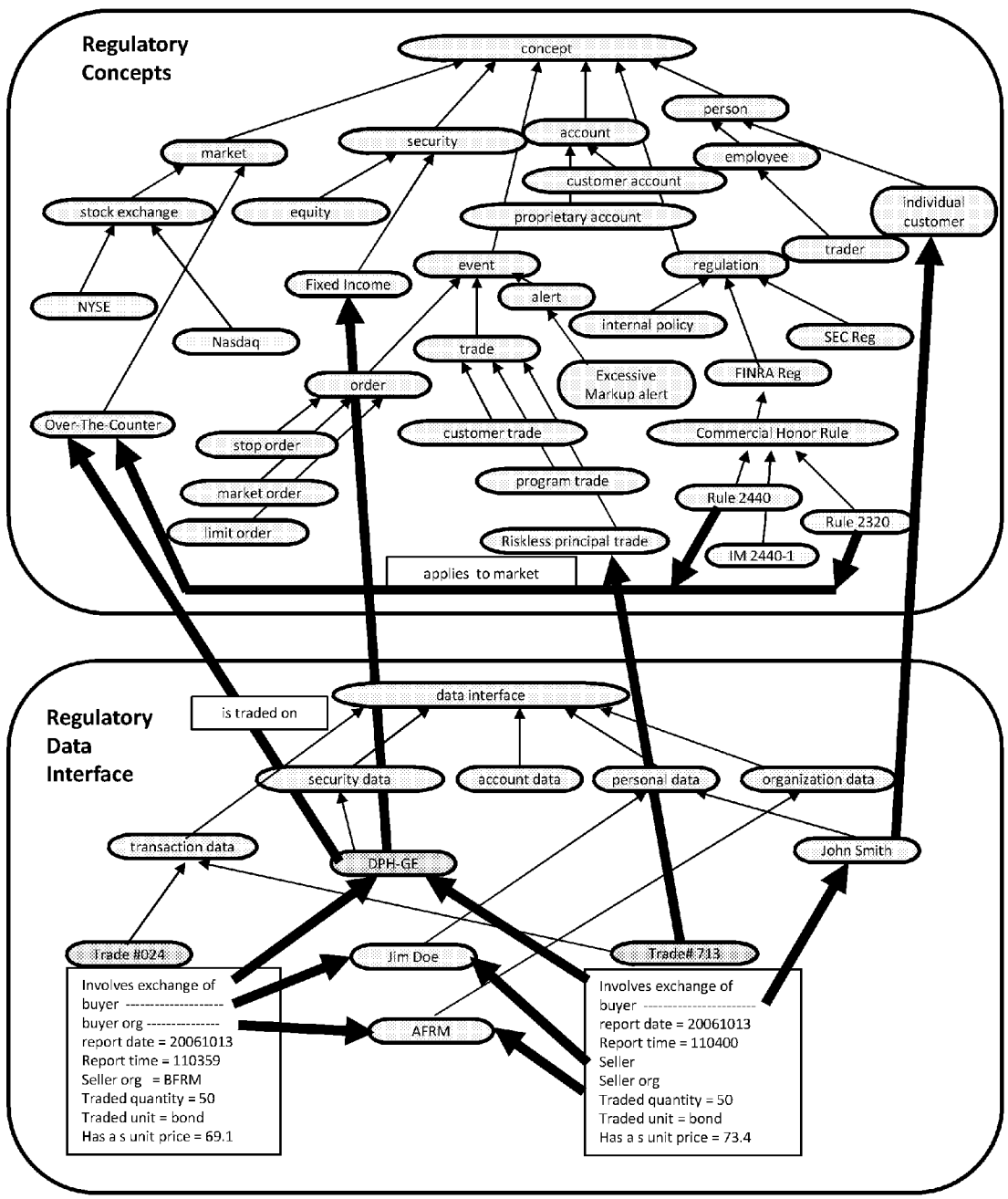
FIG. 6 shows an excerpt from semantic representation of regulatory concepts.

In describing an exemplary embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose. In addition, the drawings illustrate examples of preferred embodiments of the invention and should not be construed as limiting or requiring certain features, but rather as illustrations of certain concepts and constructs presented for better understanding of the invention.

FIG. 1 illustrates an example of a financial industry regulation written in the legal language. Such regulations, or similar (legislations, statues, guidelines), are issued by government agencies operating on the Federal or State level, or by self-regulatory organizations governing a particular industry, or they may represent corporate internal policies issued by a corporation. As can be seen in FIG. 1, Regulation (100) contains certain applicability statements (101) that describe specific types of events or actions (102) the regulation applies to, and they describe entities performing those actions or being involved in those events (103). Regulation (100) also defines objectives (104) that can be directly linked to constraints (105) that the regulation imposes. Additionally, Regulation (100) considers certain factors (106) that define the meaning and context of the regulation.

Any regulation written in the legal or in the formal business language, like Regulation (100) from FIG. 1, can be transformed and represented in a more regular format using the elements of the regulation, for instance like those distinguished and enumerated in the preceding paragraph and in FIG. 1. The transformed definition of the regulation can be represented as a semantic concept with a well structured format, as is shown in FIG. 2. The format used to represent the regulation concept is a feature-value format characterized by a set of feature-value pairs (200) that define various aspects and applicability of the regulation. Those skilled in the related arts will recognize that such information representation structures like: the frame-based constructs, the ontologies, or the entity-relationship diagrams satisfy the minimum requirements for representing the regulation as an object, or a concept, with a set of the feature-value pairs. One can also recognize a natural correspondence and the same level of details, but more structure, between the regulations represented in FIGS. 1 and 2 (101-106 and 202-208, respectively). The feature-value pairs enlisted in the preceding paragraph and in FIGS. 1 and 2 should be treated only as examples, and the actual representation of the regulations may contain the same features but is not limited to them. The feature-value pairs representing the regulation may be derived directly from the regulation legal definition, or indirectly from the context or from other relevant regulations, like for instance relationships (207, 208) in FIG. 2.

Internal policies can be represented in the same way as the external regulations. In both cases, the external regulations and the internal policies have the same overall objectives which are to impose certain limits and to set certain guidelines for corporate actions and events. The primary differences between them are the source, the priority of the regulation, and its applicability. It should be noted that the internal policies do not have to be limited to the regulatory compliance issues, as they may govern other aspects of corporate actions like responses to customer's requests, evaluations and reactions to customer or business partner actions, or others. Also, the external regulations may include legislations, statues, notices, guidelines, and other more or less official messages distributed by regulatory agencies.

The necessary components of the regulatory Knowledge Base Model are external regulations and internal policies that can be represented using the semantic structures and methods described in the preceding paragraphs. However, those regulation and policy concepts are only static descriptions of conditions and constraints that define allowed or not allowed actions, or regular or suspicious events, but as such, they cannot be directly applied to a specific situation. In order to evaluate a specific action or an event (which may be a complex event composed of a series of actions) corporations introduce analytical business procedures to be followed by people and/or systems that evaluate those events for their compliance with applicable regulations and policies. FIG. 3 includes an example of a formal description of such an analytical procedure that defines certain steps (301, 302, 303, 304, 305) and guidelines (306) to determine if a trader fulfilled his regulatory obligations when trading a fixed income (FI or debt) security and setting a price markup. In FIG. 3, one can notice references to, and the language similar to, the regulations that form the foundation for that procedure. The procedure describes specific steps that an analyst should follow to evaluate an action or an event. The procedure indicates that the original task should be decomposed into smaller tasks specific to each of the applicable regulations.

Similarly to the regulations and policies, as shown and described in the preceding paragraphs, the analytical procedures, like the one shown in FIG. 3, can be represented in a semantically structured form, an example of which is shown in FIG. 4. The key difference between the structure and content of a regulation/policy description and the structure and content of an analytical business procedure description is that the analytical business procedure includes descriptions of reasoning steps (301-305), where each of them is implemented by one or more decisions (405) to be selected and made to evaluate compliance of certain actions or events with the applicable regulations or policies. Similarly to the descriptions of the regulations/policies, the analytical procedure description includes features that define the procedure's objectives/guidelines (306) (401), applicability conditions (307) (402), input factors (308) (403), and relationships to regulations (309) (404) or to other elements of the regulatory knowledge base (310) (405). As stated above, the decisions represent executable—e.g., via a computer-assisted or otherwise automated system—reasoning steps of a business procedure. The business procedure does not enforce an exact order in which decisions are made, but rather shows a collection of decisions that use applicable input facts to achieve the procedure objective. Decisions are defined by problem statements (405) and decisions are made by rules that are related to a given decision and know how to respond to resolve the decision's problem statement. Applicability conditions of the rules will determine which rules and in which sequence are executed. The sequence in which rules are applied follows a problem decomposition paradigm, or its equivalent sequence represented as a forward or backward rule chaining paradigm, or other type of rule execution mechanism imposed by a particular rule-based reasoning engine. The business procedure is also linked to specific details like numeric thresholds, and parameters (406) to be applied in particular situations. For instance, the FI Trade Price Evaluation Procedure in FIG. 4 includes several different parameters (406).

An important characteristic of the regulatory Knowledge Base Model is the relationships between regulations, policies, business procedures, and the other element types of the Knowledge Base Model described in more details in subsequent paragraphs. FIG. 5 shows examples of such relationships that may exist between the regulations and procedures. Those relationships build an overall understanding of the regulatory environment and help to implement rules that embody reasoning steps necessary to perform the required evaluation of corporate actions and events. In particular, the example in FIG. 5 shows relationships between the Rule 2440 concept and the FI Trade Price Evaluation Procedure concept. As can be recognized, both the regulation and the procedure have objectives (501) which are similar and partially overlapping, but not identical; relationships to each other and other knowledge elements (502); applicability conditions (503); and input factors and parameters (504). Finally, the procedure objective can be achieved because of a collection of rules that support execution of particular reasoning steps. This relationship with to the supporting decision rules (505) links the procedure with the rules that use the language defined by the ontological elements described herein.

Some of the key elements of the regulatory Knowledge Base Model, i.e., the Regulation, Procedure, Decision, and Parameter concepts, refer to each other as well as to other Concepts of the Knowledge Base Model. The Concepts are introduced into the knowledge base to build the necessary language needed to define the regulations, policies, procedures, decisions, and rules that are applied according to the procedures and when there is a request to evaluate an entity, an action, or an event. All of those concepts form a structure similar to an example shown in FIG. 6. Such structure of concepts is usually hierarchical. This type of structure may be implemented in a variety of knowledge representation mechanisms like the ontology, vocabulary, the entity-relationship model and using formats specific to a particular reasoning engine or representation standards like SQL, SWRL, SBVR, XML, OWL, or RDF, or similar. The semantic representation of the features (feature-value pairs) and relationships between the knowledge elements, as shown by example in FIG. 6, allows creation of a language suitable to express the regulatory reasoning steps. The concepts in FIG. 6 represent various levels of abstractions to cover various aspects of the regulatory knowledge ranging from concepts describing market participants, types of transactions, and products traded, to the specific data streams and systems used. Again, those are only examples of possible regulatory concepts.

Figure 7:
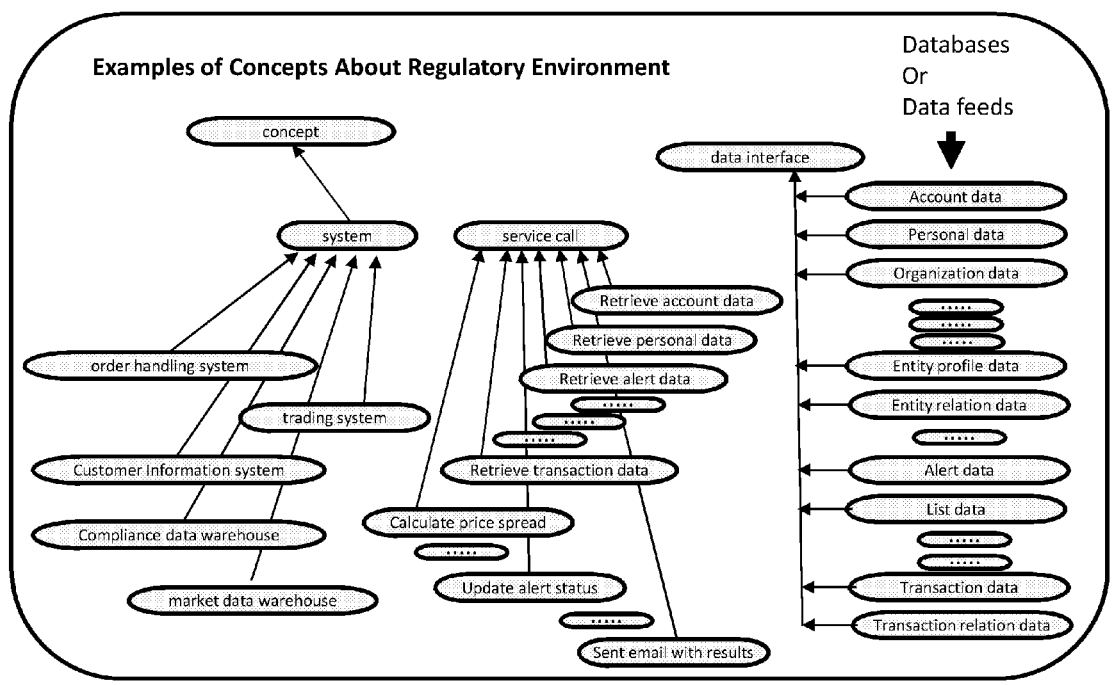
FIG. 7 shows and example of representation of knowledge about a regulated environment.

As the knowledge elements described in herein either directly represent regulations, procedures, decisions, parameters, or elements necessary to define them, other parts of the knowledge base contain concepts that define features and services of the regulated environment. Among the key concepts are those that define: Data Interface Model information and data systems, and external service calls and functions. The Service Call entities are described by messages representing calls to external services that are executed by a reasoning session controller selecting a procedure from a library of procedures. Those service calls are also described by feature-value pairs and by relations to other entities from the Knowledge Base Model. Those concepts are specific to a particular regulated environment, but they form a part of the overall regulatory knowledge base structure, because they enable instantiation of regulations and compliance procedures, thus allowing for a full utilization of the regulatory knowledge base. FIG. 7 shows examples of semantic and data interface elements that describe a regulated environment. Elements of the Data Interface Model can be grouped into the following general categories of entities: Simple Transactional Events, Complex Events, Reference Data Entities, and Profiles. They are described by feature-value pairs and their relationships to other data interface model elements and their relationships to Knowledge Base Model elements. The knowledge about the regulated environment is necessary to connect the reasoning steps about the evaluation of actions and events with certain necessary data retrieval steps or calculations performed by external service agents. The reasoning about data or information retrieval and about requests to perform certain calculations is an integral part of the regulatory knowledge base.

The following is a description of unique and advanced capabilities for representing the regulatory knowledge and the regulatory best practices in the format of rules that are derived from and built upon regulations, procedures, decisions, and other semantic knowledge elements defined and described in the preceding sections. The rules are IF-THEN rules that use the semantic knowledge elements defined in herein to both set and determine the conditions (the IF statement) and the conclusions (the THEN statement). FIG. 8 illustrates a problem decomposition paradigm that can be applied to evaluate compliance of a certain trade (802) with particular regulations (807, 808, 811). The problem statement (811) is decomposed into a data retrieval task (814) and a data analysis task (816). The problem statement is a key feature of the Decision node construct that is described in the same manner as other elements of the knowledge base model, e.g. by feature-value pairs and relations to other elements. This type of Decision is made by one of the rules linked to the decision (811) that has its conditions satisfied by the problem description. The decomposition further indicates that such an evaluation (816) task needs to be decomposed into three simpler following tasks (817): Determination of the Security Liquidity, Determination of the Price Volatility, and Determination of the Price Deviation. As those skilled in the art will notice, the sub-problems are not simple problems, and their resolutions may require either calls to external services or further decompositions to get to elementary problems that can be solved by a single reasoning step. The description of the problem decomposition steps includes references to several data elements, like for instance 813 and 815, which make the description of the problem and its resolution refer to both the regulatory concepts that drive the required analytical steps and the events and entities that are part of the analyzed situation. Various reasoning engines may provide direct or indirect support for implementation of the problem decomposition paradigm.

Figure 9:
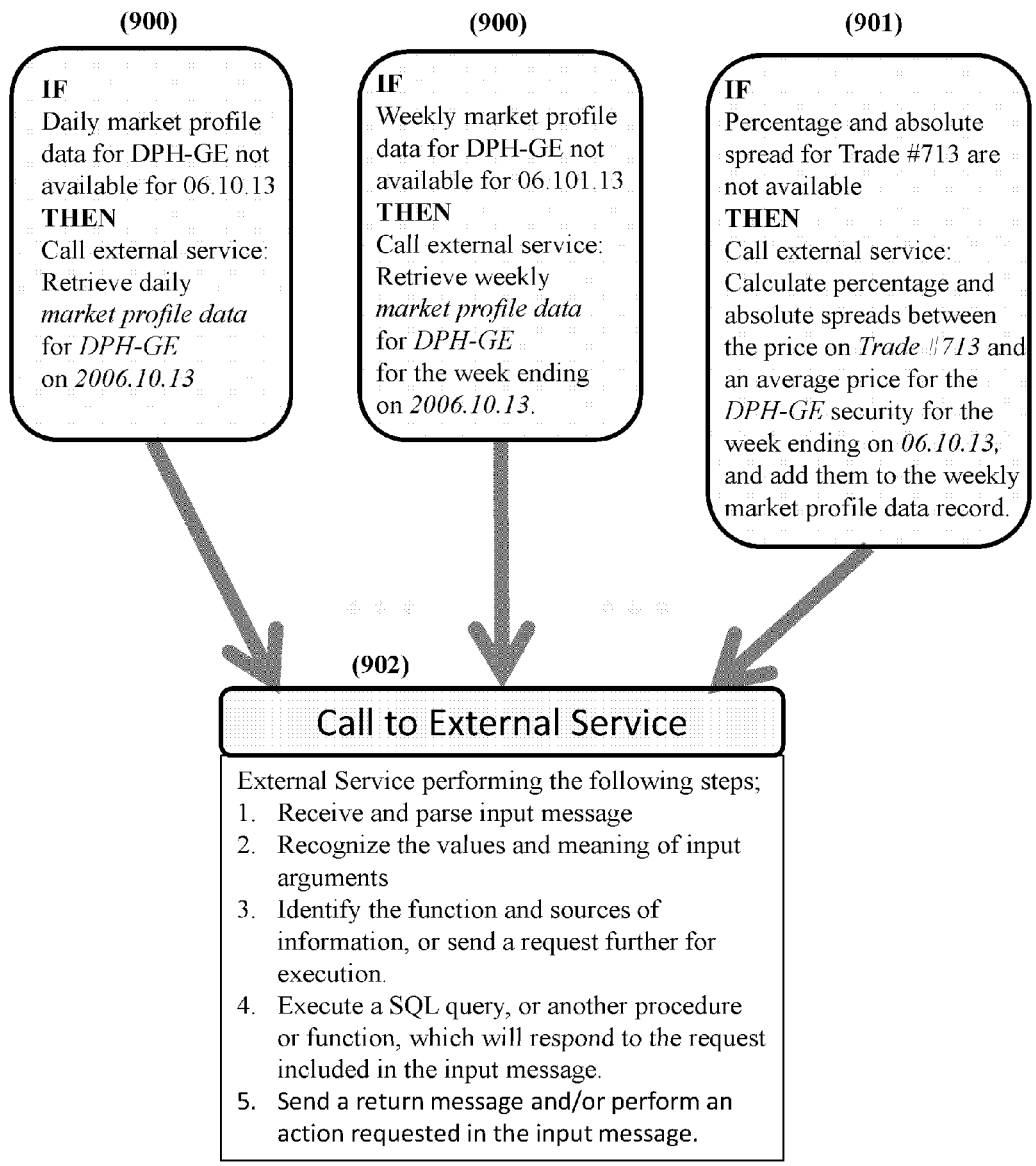
FIG. 9 shows an example of a regulatory fact collection rule.

Ultimately, the applied problem decomposition paradigm may lead to simpler problems that can be solved by using input facts not derived by other rules. Typical facts will be established based on processing of some data elements retrieved from one or more information sources. For instance, FIG. 9 shows how basic facts are collected in order to draw component conclusions. In those particular instances, the daily and weekly market data profiles are retrieved (900), or the determination of the price spread is calculated based on external data sources (901) by a specialized service described by the External Service knowledge component (see for example, FIG. 7). Calls to external services (900, 901) include references to data elements necessary to deliver the service (902). Such external services can be implemented in a variety of ways, including Service Oriented Architecture (SOA) paradigm, or Structured Query Language (SQL) based servers.

The problem decomposition paradigm leads to identification and resolution of elementary problems. The resolutions to those elementary problems are facts/statements that later need to be combined into solutions to intermediate problems, and finally into the final solution to the original input problem. FIG. 10 shows an example of such a step (a rule) which composes an intermediate solution by combining input facts with derived facts delivered by other rules. It should be noted that the exemplary rule in FIG. 10 contains several conditions that directly link the underlying events (1005, 1006) and entities (1008, 1009, 1011) with regulatory concepts and procedures (1002, 1017, 1019) and their objectives (1003), applicability conditions (1004, 1007, 1015, 1016) and necessary input facts (1012, 1013, 1014, 1022, 1023, 1024). The conclusions of the rule use language elements from the regulatory Knowledge Base Model and the Data Interface Model that are identified in the rule conditions and text templates associated with rules to form natural language statements about decisions (1025, 1027), entities (1026), input facts (1028), and decision drivers (1029). Thus, the Rule construct contains zero or more conditions expressed in the Conjunctive Normal Form, where each Conjunct is represented by a feature-operator-value triple where the feature name corresponds to a feature name from the data interface model or it is a derived feature name, and the feature value is either numeric, Boolean, date, or a relation to a Concept or to a Parameter entity, and it contains zero or more concluding actions represented as feature-value pairs where the value can be assigned or computed, and it contains zero or more relations to Concept entities. Execution of rules formatted in the way described above can be easily implemented by linking those rules to decisions (1000) that they make and matching their conditions against the current content of the regulatory knowledge base model and the data interface model. Such matching of the rule conditions can be achieved by a set of programmable instructions, like SQL scripts, that can be associated with each decision node and executed when a reasoning session controller has to make a particular decision. Those programmable instructions will cause a selection of a rule and performance of the rule actions like, for example, creation of new decision nodes, invocation of external service calls, or recording of decisions made by deriving and assigning values to selected features.

Finally, intermediate solutions are further used by other rules to generate higher level solutions until they reach the level of the original input problem. For example, FIG. 11 shows how the final conclusions can be formed from the intermediate component conclusions. The final answers to the input requests may vary in details from very short one (1100), to very detailed one (1101) which relies on details derived by the other rules. A response to an input request can be also an action taken based on the generated results, like an example shown in FIG. 11 (1102). It should be noted that the construction of the rules and the results they generate is based on natural language composed of elements of regulatory Knowledge Base Model and Data Interface Model that support ontological representation of the regulatory concepts and data. The Interface, similar to one shown in FIG. 11, receives input requests and sends output responses and operates like an instant messaging window where both input requests and output responses are in the form of semi-structured natural language sentences with varied amount of details and explanations of regulatory decisions that are determined by the input request and a reasoning process that responds to that request. The input requests cause displaying of regulatory knowledge retrieved from the regulatory Knowledge Base Model storage and the regulatory knowledge is displayed in a format similar to its native representation.

Figure 12:
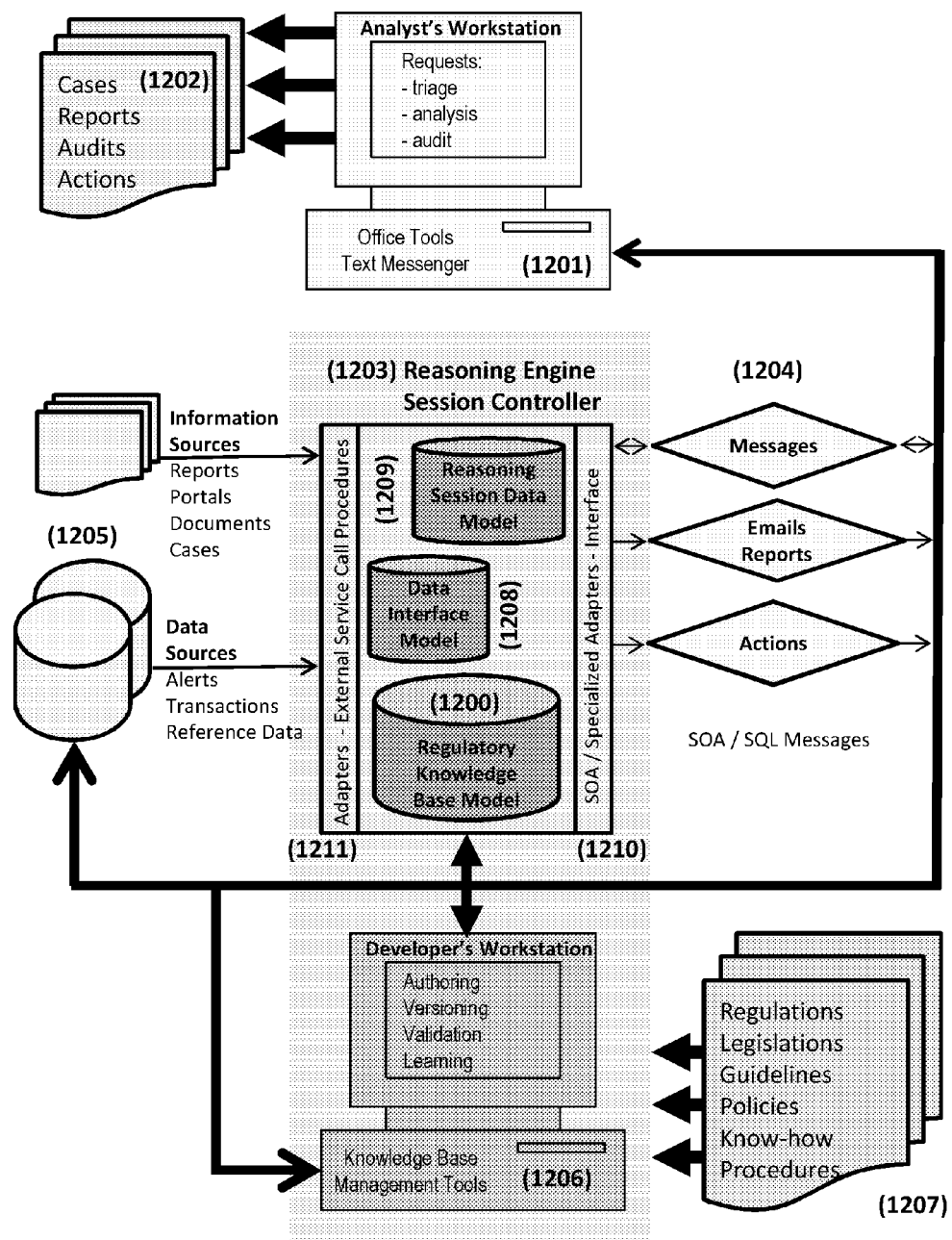
FIG. 12 shows a diagram of the Regulatory Knowledge Base development, utilization, and maintenance systems and environment.
Figure 13:
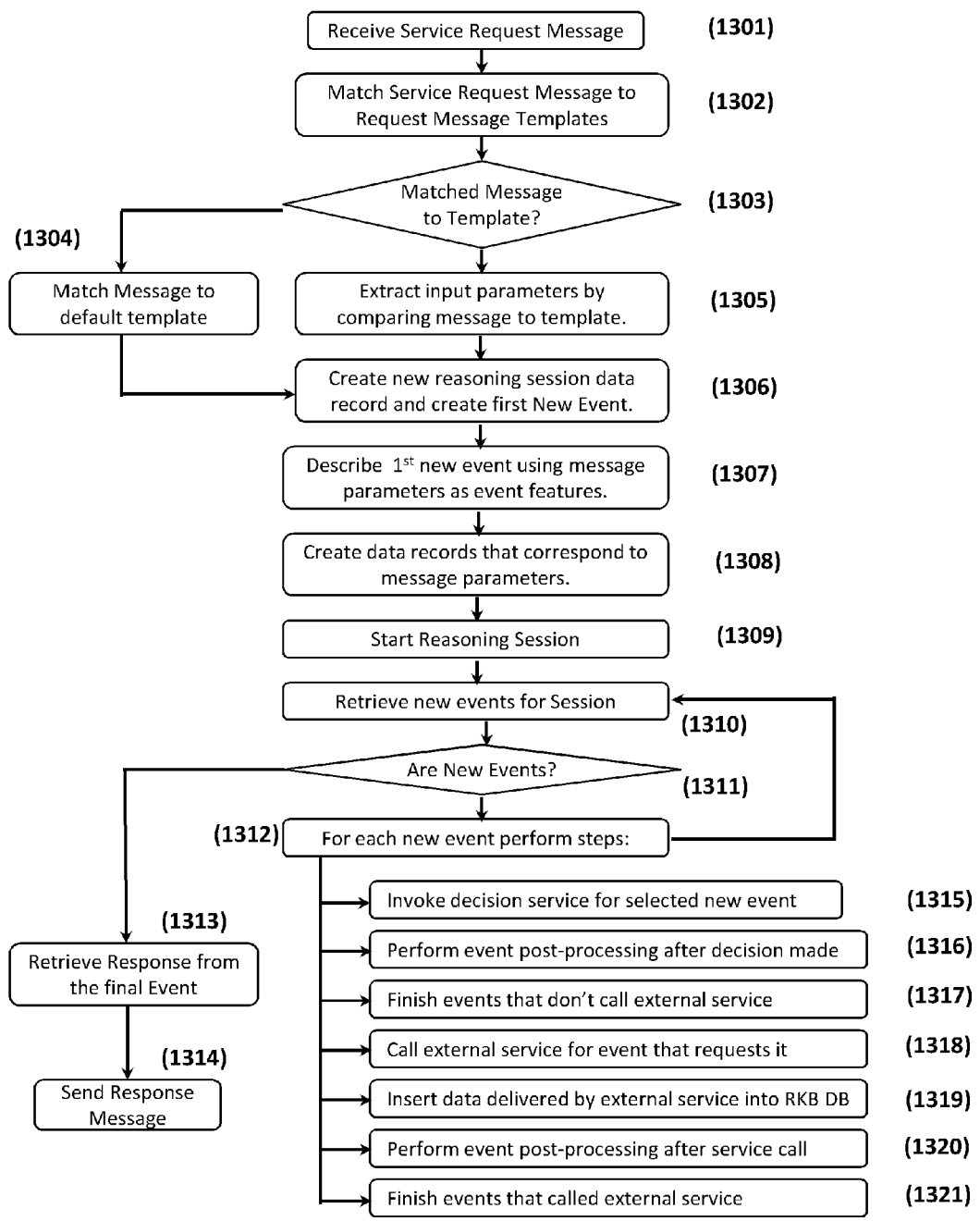
FIG. 13 shows a flow diagram for the Reasoning Session Controller.

The preceding sections described the model and structure of the regulatory knowledge base, as well as the major categories of the knowledge base components, including types of concepts and types of rules. Also, relationships between the concepts, and between the concepts and rules, were described and illustrated by examples. Accordingly, the regulatory Knowledge Base Model can be characterized as: representation of knowledge from at least one source, where the knowledge is represented as semantic elements and as reasoning rules that use the semantic elements and together with the semantic elements form a regulatory knowledge base and a regulatory knowledge system: 1) where the semantic elements contain descriptions of regulations, policies, procedures, decisions, parameters, and all of the other concepts necessary to represent and properly describe them; 2) where the semantic elements containing those concepts representing the regulations, policies, and procedures and all of those other concepts necessary to form their full descriptions may be stored in a variety of formats, including but not limited to the ontology, the semantic networks, the frame-like representation, or the data models represented as entity-relationship diagrams; 3) where the such-defined regulatory knowledge base can be used by a reasoning engine to respond to input requests that aim at determination of whether an action/event described by the request is compliant with the regulations and policies; and 4) where the reasoning rules use the semantic elements, especially the regulations, policies, and procedure concepts, to describe reasoning steps necessary to respond to the input requests;

The regulatory knowledge base components are static, and by themselves, will not generate any solutions, such as evaluation of corporate actions or events. However, when those knowledge elements are deployed on a reasoning engine platform (for instance Disciple-FS, Corticon, Oracle's Haley, SQL-based database engines, or similar suitable platforms) they can be utilized to generate solutions. The following sections define methods for deployment, utilization, and maintenance of the Regulatory Knowledge Base with the model being the same as or similar to that described in previous sections. FIG. 12 shows a diagram that illustrates the architecture and flow of information in the environment where the regulatory Knowledge Base Model (1200) is deployed together with the Data Interface Model (1208) and the Reasoning Session Data Model (1209). FIG. 13 shows a flow diagram and steps performed by the Reasoning Session Controller.

The Regulatory Knowledge Base can be deployed on a reasoning engine platform that supports representation of the regulatory Knowledge Base Model, and on a platform that provides mechanisms that allow concepts to be organized into structures the same as or similar to ontologies, vocabularies, terminologies, or entity-relationship diagrams. Additionally, the reasoning engine platform supports representation of rules that use the knowledge elements defined by the ontologies, vocabularies, terminologies, or entity-relationship diagrams. The supported rule formats are capable to define the rule elements both as logical constructs as well as natural language sentences that contain zero or more concepts, entities, or frame-based structures. The reasoning engine platform has an execution engine that will apply the rules using one or more of the rule execution paradigms, like problem decomposition, forward chaining, backward chaining, or others as they are known to those skilled in the art. The Regulatory Knowledge Base deployment process may require some modifications of the Regulatory Knowledge Base that are necessary either due to the specificities of the environment or the rule engine itself. In the case where the regulatory Knowledge Base Model is deployed as an entity-relationship data model, the system includes the following elements: (i) A Reasoning Session Data Model (1209) for representation and storage of the reasoning session data composed of the following entities: Reasoning Sessions, Session Events, and their Features and their Relationships to other session data model entities and their Relationships to Data Interface Model (1208) entities and their Relationships to knowledge base model entities; (ii) A Reasoning Session Controller (1203) receiving an input request from an Interface (1210) and matching this request to a record from the Decision entity from the Knowledge Base Model, executing Programmable Instructions from that decision record, performing post-processing tasks after execution of the programmable instructions has finished, and selecting the next new session Event for execution; and (iii) A Library of External Service Call Procedures (1211) that are invoked by Service Calls taking a subset of parameters established by a reasoning session and using those parameters to call external services, and placing results returned by the external services in the Data Interface repository. Such a database system, SQL-based for example, will perform reasoning session control steps as illustrated in FIG. 13. The main processing steps for each reasoning session are: receive an input message and match it to a problem description template associated with a decision (1301-1304); identify and extract parameter values based on the template and positions and types of variables associated with it (1305); create a new session and the first new event based on the first decision that starts resolving the input problem (1306, 1307) and create necessary records in the data interface model (1308); start the reasoning session and select new events associated with the current session (1310-1312); for each new event, identify a corresponding decision node and execute programmable instructions associated with that decision (1315) which will cause actions prescribed by a selected rule, perform decision post-processing tasks like calling a requested external service and storing its results or performing text processing based on templates associated with selected decision nodes and feature-values generated by the selected rule (1316-1321); and when there are no new events to process, retrieve a final response from the final event and pass it to the interface module (1311, 1313, 1314).

Utilization of the Regulatory Knowledge Base, when deployed on a reasoning engine platform or used by a reasoning controller like the one exemplified in FIG. 13, may take several forms. The Regulatory Knowledge Base can be queried to check if certain actions (for example, stock market trades or financial transactions like transfers of funds) or events (for example, indicators pointing to or describing instances of certain behaviors of interest like suspicious transactions, manipulative trades, or account balances exhibiting unusual changes) are compliant with the regulations or policies embedded in the Regulatory Knowledge Base. Such inquiries can be issued as semi-structured natural language sentences, and answers to those inquiries can also be represented as semi-structured natural language sentences, such as those illustrated in FIG. 11. In order to generate semi-structured natural language responses to those inquiries, the regulatory knowledge is to be represented as described herein and is to be deployed on a reasoning engine platform or used by a reasoning session controller as described herein. The inquiry from FIG. 11 is an example of a triage task that in many cases could be performed by an analyst who would need to have a certain minimum level of regulatory knowledge and reasoning skills. The action or event triage tasks are only one example of the utilization of the Regulatory Knowledge Base. Other examples of utilization include supporting an analyst and performing analysis of facts to draw partial conclusions, performing an audit on previously investigated actions or events, and taking action to stop a transaction execution. As exemplified in FIG. 12, the Regulatory Knowledge Base (1200) utilization can be achieved by its deployment on a reasoning engine platform or reasoning session comptroller (1203) comprising: 1) a mechanism that retrieves and applies the reasoning rules from the Regulatory Knowledge Base that are necessary to perform reasoning steps that generate an answer or an action that responds to the input request (1203); 2) an interface that allows for receiving one or more inquiries that come in the form of semi-structured natural language sentences that use semantic elements from the Regulatory Knowledge Base, and that allows for sending one or more answers in the form of semi-structured natural language sentences that respond to the input inquiries (1201); and 3) various interfaces that allow for communicating with other systems or services (1205) available in the environment in which the reasoning engine platform is deployed.

The Regulatory Knowledge Base constructed and represented as described herein can be maintained in a variety of ways. First, it can be edited using specialized editors, such as a combination of Excel-like spreadsheet tools with macros and SQL script editors that allow for manipulation of the knowledge elements described herein. Such editors are usually components (1206) of the reasoning engine platforms and they allow for manipulation of semantic knowledge elements and rules of knowledge bases, as shown in FIG. 12. In addition, some reasoning engines may have learning capabilities and knowledge base validation tools that facilitate and may improve the process of updating or adding of knowledge elements. Such learning and validation processes are feasible due to the structure of the Regulatory Knowledge Base having the semantic components that facilitate a natural communication with the expert through natural language interactions. The Regulatory Knowledge Base can be maintained by editing knowledge base elements to respond to new regulations or policies, or to respond to updates of existing regulations or policies (1207), or to introduce updates through learning from past experience.

The many features and advantages of the invention are apparent from the detailed specification. Since numerous modifications and variations will readily occur to those skilled in the art, it is not desired to limit the invention to the exact construction and operation illustrated and described. Accordingly, all appropriate modifications and equivalents may be included within the scope of the invention.

What is claimed:

1. A computer system tangibly operating in an information technology hardware and software environment, comprising:
    a knowledge base model for representation and storage of regulatory knowledge, the regulatory knowledge including the following knowledge base model entities: regulations, procedures, parameters, concepts, decisions, rules, service calls, and their features and relationships to other knowledge base model entities;
    a data interface model for representation and storage of regulatory data, the regulatory data including the following groups of data interface model entities: simple transactional events, complex events, referential entities, profiles, and their features and their relationships to other data interface model entities and their relationships to knowledge base model entities;
    a reasoning session data model for representation and storage of the reasoning session data, the reasoning session data including the following reasoning session data model entities: reasoning sessions, session events, and their features and their relationships to other session data model entities and their relationships to data interface model entities and their relationships to knowledge base model entities;
    an interface configured to receive a request in the form of a structured or semi-structured message from an external source, to pass the received message to a reasoning session controller, and upon receiving a response from the reasoning session controller, pass that response to the external source;
    a reasoning session controller configured to receive an input request from the interface and to match the input request to a decision record from the knowledge base model decision entity, execute programmable instructions from the decision record, perform post-processing tasks after execution of the programmable instructions is completed, and select a next new session event for execution;
    a library of procedures configured to be invoked by a service call, take a subset of parameters established by a reasoning session and use those parameters to call external services, and place results returned by the external services in a data interface repository.

2. The system of claim 1, wherein the regulation entity comprises multiple regulations, statues, legislations, interpretative guidelines, and internal policies, all of them being described by feature-value pairs that correspond to features of a regulation legal definition, and by relations to other knowledge base model regulations and concepts.

3. The system of claim 1, wherein the procedure entity comprises multiple business procedures described by feature-value pairs that correspond to features of a business procedure formal definition and by relations to knowledge base model regulations, concepts, decisions, and parameters.

4. The system of claim 1, wherein the parameter entity comprises multiple parameters of various types, the parameters being described by feature-value pairs that correspond to features of the parameters associated with formal definitions of business procedures, and by relations to knowledge base model regulations, procedures, concepts, and decisions.

5. The system of claim 1, wherein the concept entity comprises multiple concepts necessary to describe regulations, procedures, parameters, decisions, rules, and service calls, the concepts being described by feature-value pairs and by relations to other concepts.

6. The system of claim 1, wherein the decision entity comprises multiple decision problems of various types described by feature-value pairs that correspond to features of decision formal definitions, and further comprises relations to rules configured to make one or more decisions for solving the decision problem, programmable instructions configured to gather and format data factors necessary to make the one or more decisions, programmable instructions adapted to match data factors against rule conditions, programmable instructions configured to select a rule whose conditions are satisfied, and programmable instructions configured to execute actions associated with the selected rule.

7. The system of claim 6, wherein the programmable instructions are implemented as an SQL script, SQL stored procedures, and SQL functions.

8. The system of claim 1, wherein the rule entity comprises zero or more conditions expressed in a conjunctive normal form, each conjunct of the conjunctive normal form being represented by a feature-operator-value triple wherein a feature name of the feature-operator-value triple corresponds to a feature name from the data interface model or a derived feature name, and the feature value is in a form that is one of numeric, Boolean, date, relation to a concept or relation to a parameter entity; and zero or more actions represented as feature-value pairs wherein the value can be assigned or computed, or as relations to concept entities.

9. The system of claim 1, wherein the service calls entity contains multiple service calls described by messages representing calls to external services that are executed by the reasoning session controller selecting a procedure from the library of procedures, and further described by feature-value pairs and by relations to other entities from the knowledge base model.

10. The system of claim 1, wherein the simple transactional event, complex event, referential entity, and profile entities comprise transactional data, transaction groups data, referential data, and summary profile data described by feature-value pairs, by mutual relations, and by relations to entities in the knowledge base model.

11. The system of claim 1, wherein the reasoning session and session event entities comprise data created by the reasoning session controller, and the reasoning session and session event entities are described by feature-value pairs, and by their relations to data interface model entities, and by their relations to knowledge base model entities.

12. The system of claim 1, wherein the knowledge base model, the data interface model, and the reasoning session data model for representation and storage of regulatory knowledge, regulatory data, and reasoning process data, are implemented as entity-relationship database models and deployed on a database engine.

13. The system of claim 12, wherein the database engine supports the Structured Query Language standard.

14. The system of claim 1, wherein the reasoning session controller is implemented utilizing a programming language that supports connectivity with database engines for execution of scripts, stored procedures, and functions.

15. The system of claim 1, wherein the interface is configured to operate as an instant messaging window while receiving input requests and sending output responses.

16. The system of claim 15, wherein the input requests and the output responses are formed as semi-structured natural language sentences having varied amounts of detail and explanations of regulatory decisions, the amounts of detail and explanations being determined by the input requests and a reasoning process that responds to the requests.

17. The system of claim 15, wherein input requests are configured to cause a displaying of regulatory knowledge retrieved from a regulatory knowledge base storage, the regulatory knowledge being displayed in a format that is substantially similar to a native feature-value representation of the regulatory knowledge.

18. A computer program product, tangibly embodied in a machine readable medium, comprising instructions operable to cause a computer to perform the following:
   establish a knowledge base model for representation and storage of regulatory knowledge including the following entities: regulations, procedures, parameters, concepts, decisions, rules, and service calls, and their features and relations;
   establish a data interface model for representation and storage of data including the following entities: simple transactional events, complex events, referential entities, profiles, and their features and relations;
   establish a reasoning session data model for representation and storage of the reasoning process data including the following entities: reasoning sessions, session events, and their features and relations;
   receiving in an interface a request in the form of a structured or semi-structured message from an external source;
   sending the received request to a reasoning session controller;
   receiving in the reasoning session controller the request from the interface;
   matching the received request to a record from the decision entity of the knowledge base model;
   executing programmable instructions from the decision entity record;
   performing post-processing tasks after completing the programmable instructions;
   selecting a next new session event for execution;
   invoking a library of external service call procedures via one or more service calls;
   receiving a subset of parameters established by a reasoning session;
   using the received subset of parameters to call one or more external services;
   receiving results returned by the called one or more external services;
   placing the results returned by the called one or more external services in a data interface repository;
   producing an output response in the reasoning session controller;
   receiving in the interface a response from the reasoning session controller; and
   passing the received response to the external source.

19. The computer program product of claim 18, wherein the knowledge base model includes a repository that contains data describing a plurality of regulations, procedures, parameters, concepts, decisions, rules, and service calls pertaining to the application domain of the computer program.

20. A computer implemented method for representing, using, and maintaining regulatory knowledge comprising:
   providing a knowledge base model for representation of regulatory knowledge, the knowledge base model including a plurality of entities represented and defined by at least one feature-value pair, wherein the feature's values may take multiple formats including numbers, flags, dates, symbolic concepts or relations to symbolic concepts, and relations to other entities, the plurality of entities including: (i) regulations, (ii) symbolic concepts, wherein the symbolic concept includes a structure containing a designated relation that allows for representing a hierarchy of concepts, (iii) procedures, (iv) parameters, (v) decisions, wherein decisions are described by the following additional features: problem statements that are text templates with placeholders that point to other elements of the knowledge base model, the decision type feature having a plurality of symbolic values that designate a type of decision, (vi) rules, wherein rules have relationships to decisions they make, and (vii) service calls, wherein service calls are described by the following additional features: service call message text templates with placeholders that point to other elements of the knowledge base model, and a service call type feature having a plurality of symbolic values that designate a type of a service call, and wherein the service call when executed by an external control apparatus causes certain actions to be taken by certain external software modules, and results of those actions may be returned back for storage;

providing a data interface model for representation of data referred to by elements of the knowledge base model, the data interface model comprising a plurality of entities represented and defined by at least one feature-value pair, wherein the feature's values may take multiple formats including numbers, flags, dates, symbolic concepts or relations to symbolic concepts, relations to other entities of the regulatory knowledge base model or to other elements of the data interface model, the plurality of entities including: (i) simple events, (ii) complex events that contain summaries and relationships to simple events, (iii) entities that are referred to by simple events and complex events and that relate to elements of the knowledge base model, and (iv) profiles of entities;

providing an interface module;

receiving in the interface module an input request in the form of a structured or semi-structured format text message;

sending the received input request to a reasoning engine;

receiving in the reasoning engine the input request from the interface module;

matching the received input request to rules included in a reasoning engine rule base;

applying the rules to an internal algorithm;

executing the internal algorithm to resolve the input request;

producing an output response;

sending the output response to the interface module;

receiving in the interface module the output response from the reasoning engine;

providing a reasoning session model for representation of the reasoning process data, the reasoning session model comprising: (i) a data structure that supports storage of reasoning session records, and (ii) a data structure that supports storage of session events, wherein each session event represents an individual decision that is made using the computer implemented method.

21. The method of claim 20, wherein the knowledge base model comprises a plurality of regulations, statues, legislations, interpretative guidelines, internal policies, or other types of laws that govern the structure and operations of a business concern or an individual; business procedures including reasoning steps, wherein each reasoning step is accomplished by making one or more decisions; parameters used by procedures, decisions, or rules; and concepts pertaining to a given application domain.

22. The method of claim 21, wherein the rules in the knowledge base model comprise one or more of the following types: (i) input request processing rules, (ii) problem decomposition rules, (iii) service call rules, (iv) decision rules, and (v) output response composition rules; the rules being operable to analyze the input request, link it to a problem statement associated with a decision, decompose the initial problem into sub-problems, solve terminal problems by making decisions or by assigning service calls, and compose an output response based on decisions made.

23. The method of claim 20, wherein the knowledge base model is represented as an entity-relationship database model.

24. The method of claim 20, wherein the knowledge base model is represented as an ontological model.

25. The method of claim 20, wherein the knowledge base model is represented as a vocabulary model.

26. The method of claim 20, wherein the data interface model is represented as an entity-relationship database model.

27. The method of claim 20, wherein the data interface model is represented as an ontological model.

28. The method of claim 20, wherein the data interface model is represented as a vocabulary model.

29. The method of claim 20, wherein the interface module comprises a computer program operable to cause a computer to receive input request messages from an external source, pass the input request messages to the reasoning engine, receive output messages from the reasoning engine, and send the output responses received from the reasoning engine to the external source.

30. The method of claim 29, wherein the reasoning engine comprises a rule engine software product that includes and is operatively coupled to its own reasoning session model.

31. The method of claim 30, wherein the utilization of the knowledge base model components for evaluating compliance of events with applicable regulations includes the following: (i) periodically receiving structured, or semi-structured natural language requests to evaluate compliance of certain events, actions, or entities with applicable regulations; (ii) interpreting those requests to determine applicability of the regulations and policies that should be used to respond to those requests; (iii) retrieving applicable knowledge elements that analyze the request and decompose it into components to which various elements of the regulatory knowledge are applicable; (iv) collecting certain facts necessary to evaluate the request and determining their validity based on the applicable knowledge components; (v) composing intermediate conclusions based on the collected facts and other conclusions; and (vi) drawing the final conclusion that is presented as a response to the original request.

32. The method of claim 31, wherein the development and maintenance of the regulatory knowledge embedded into the knowledge base model is done using the tools provided by the reasoning engine.

* * * * *